Oct. 29, 1968 TADAO ASANO ETAL 3,408,118
BRAKE APPARATUS FOR A VEHICLE
Filed Dec. 14, 1966
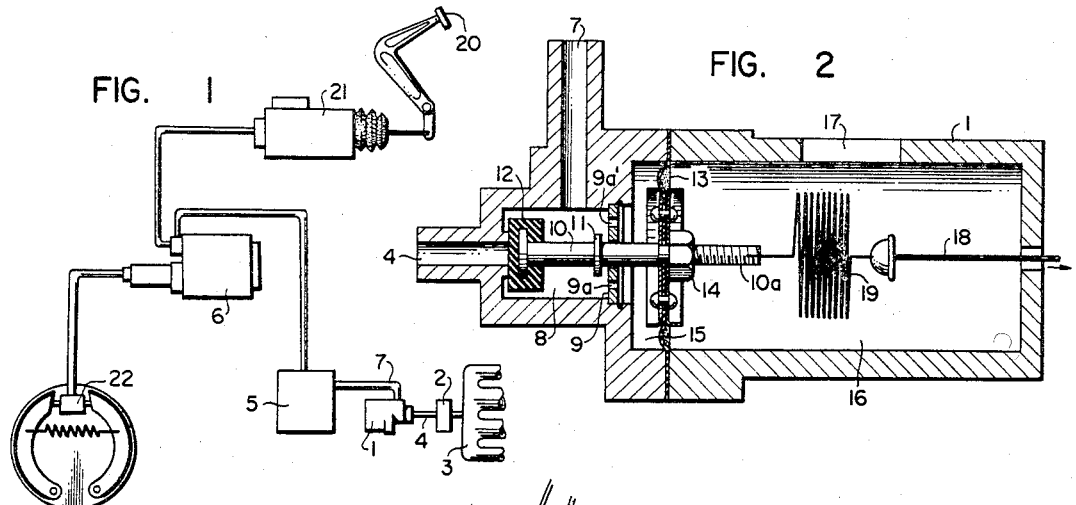
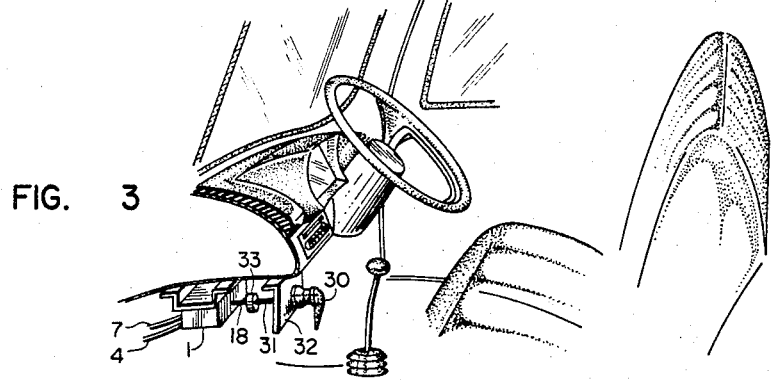
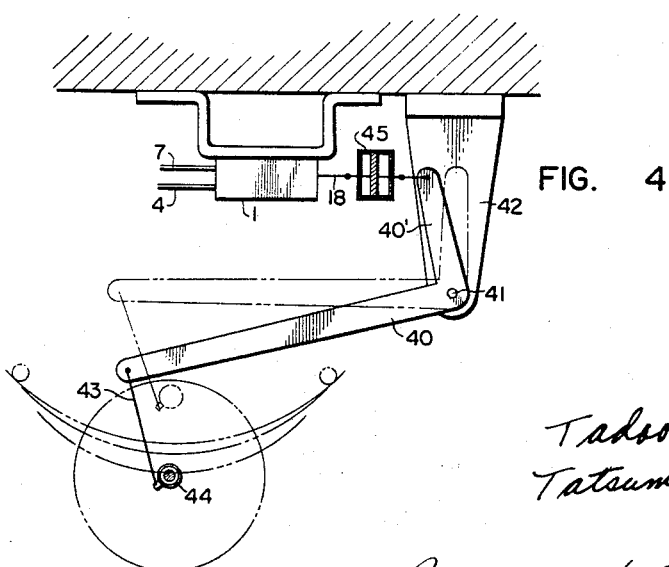

United States Patent Office 3,408,118
Patented Oct. 29, 1968

3,408,118
BRAKE APPARATUS FOR A VEHICLE
Tadao Asano, Kariya, and Tatsumi Torii, Anjo, Japan, assignors to Aisin Seiki Kabushiki Kaisha, Kariya, Aichi Prefecture, Japan
Filed Dec. 14, 1966, Ser. No. 601,682
3 Claims. (Cl. 303—22)

ABSTRACT OF THE DISCLOSURE

This invention relates to a brake apparatus for a vehicle, particularly to a brake apparatus equipped with a brake booster which is arranged between the master cylinder and the wheel cylinders, the negative pressure generated in an internal combustion engine or a vacuum pump being utilized for operating said brake booster. In the brake apparatus of the present invention, there is provided a device for controlling the negative pressure for the booster according to variation of weight of the load on the vehicle.

---

Usually, on applying brake in a vehicle, the driver has to control his foot pressure on the brake pedal according to variation of weight of the load on the vehicle. Objects of the present invention are to obviate such manual control of the pressure upon the brake pedal, so that the driver may always apply constant pressure upon the brake pedal, regardless of the weight of the load, and thereby to attain easier driving with less fatigue. These and other objects will appear from the following description and the accompanying drawings. In the drawings, FIG. 1 is a diagrammatic view of the brake apparatus according to the present invention;

FIG. 2 is a longitudinal section of the device for regulating the negative pressure for the booster;

FIG. 3 is a schematic view of a manual means for setting the bar or Bowden wire in the control device according to variation of weight of the load on the vehicle; and FIG. 4 is a schematic view showing an automatically actuatable means for same purpose.

Referring to the drawings, 1 designates a casing of the negative pressure regulating device for the brake booster, and a duct 4 at one end thereof is connected to the intake manifold 3 of a vehicle engine (not shown) or to a vacuum pump through a check valve 2. This negative pressure regulating device 1 is also provided with a duct 7 which is connected to a negative pressure type booster 6 through a negative pressure reservoir 5. Said ducts 4 and 7 open into a cylinder 8 in the casing 1. To the inner end of the cylinder 8, there is fixed a guide disc 9 having orifices 9a and 9a' and a central bore, through which bore, a rod 10 is loosely passed. On the rod 10, there are securely mounted a collar or stopper 11 near to the guide disc 9 and a stop valve 12 at its outer end adapted to close the duct 4. The inner end portion of the rod 10 is screw threaded and a diaphragm 13 is secured thereto by means of a nut 14, the periphery of the diaphragm being secured to the casing 1. By said diaphragm the interior of the casing 1 is divided into two chambers, the first chamber 15 and the second chamber 16, the latter being in communication with the atmosphere through an opening 17. 18 is a bar or a Bowden wire adapted to be manually or automatically pulled in the direction of the arrow and adapted to be set in a predetermined position according to variation of the weight of the load on the vehicle. Said bar is connected to the rod 10 through a spring 19. There are illustrated in FIGURES 3 and 4, by way of example, a manual device and an automatically actuatable device for pulling the said bar or Bowden wire 18 according to variation of weight of the load on the vehicle. Referring to FIGURE 3, 30 is a crank handle having a screw threaded rod 31 and supported by a screw threaded bracket 32 for rotation, and said screw threaded rod 31 is adapted to be axially moved by rotation of the crank handle 30. At its inner end, the rod 31 is connected to the bar 18. 33 is an adjustable stopper fixed on the rod 31. It is to be understood that with the stopper 33 in the position shown there is no load on the vehicle, so that the bar 18 is not pulled in the direction of the arrow. With an increase in the weight of the load on the vehicle, the operator may actuate the crank handle 30 to bring the stopper 33 backwardly so as to pull the bar 18 in the direction of the arrow (FIGURE 2). Referring to FIGURE 4, a bellcrank lever 40 is pivoted at 41 to a bracket 42 depending from the chassis, of which the lower arm is connected to the free end of an arm 43 pivotally connected to the axle 44 of the vehicle. The upper arm 40' of said bellcrank lever 40 is connected to the bar or Bowden wire 18. 45 is an antivibration oil damper. It will be seen that with an increase in the weight of the load on the vehicle, resulting in an upward movement of the axle 44 relative to the vehicle chassis, the bellcrank lever 40 will be oscillated in the clockwise direction, so that the bar or Bowden wire 18 will be pulled in the direction of the arrow.

The operation of the present invention is as follows: Assuming that the negative pressure is zero, and that the bar 18 is manually pulled in the direction of the arrow and set in a predetermined position, thereby the rod 10 is also moved in the same direction, so that the stopper 11 is maintained in the position abutting against the guide disc 9, the valve 12 being held open. In this position, the duct 4 and the cylinder 8 are in communication. When vacuum is generated through the duct 7, the negative pressure will be increased in the reservoir 5, so that the negative pressure in the first chamber 15 will also be increased through the orifices 9a and 9a'. As a result, the rod 10 will be moved leftwardly against the action of the spring 19, returning to its initial position and shutting off the communication between the ducts 4 and 7 by means of the valve 12, and the negative pressure in the reservoir 5 will not be increased beyond the predetermined degree.

When the brake pedal 20 is depressed by the driver, increasing oil pressure in the master cylinder 21, the wheel cylinders 22 are acted upon through the booster 6, and the negative pressure in the reservoir 5 will be decreased and, consequently, the negative pressure in the cylinder 8 and the first chamber 15 will also be decreased, whereby contrary to the above mentioned, the rod 10 will be pulled in the direction of the arrow by the action of the spring 19, again bringing the duct 4 and the cylinder 8 into communication, so that the negative pressure in the reservoir 5 will be increased to the predetermined degree.

The above mentioned operation is repeated, and the degree of the negative pressure necessary for maintaining the necessary negative pressure in the reservoir 5 may be maintained within the predetermined range as set by the bar 18 by manual or automatic means. Thus, it is possible beforehand to vary the degree of the negative pressure according to the variation of the weight of the load on the vehicle by the above mentioned operation, so that the driver's pressure upon the brake pedal may be kept constant.

What we claim is:

1. A brake apparatus for a vehicle comprising a master cylinder, negative pressure type brake booster adapted to utilize a source of negative pressure from the vehicle engine or a vacuum pump and connected to said master cylinder, wheel cylinders connected to said brake booster, a negative pressure regulating device having a cylinder and a first opening into said cylinder adapted to be coupled with the said source of negative pressure and a second opening in communication with said brake booster, a guide disc closing the inner end of said cylinder and having orifices therein, a rod having at one end a valve movable to close and open one of said openings to control the communication of said cylinder with the source of negative pressure, the other end of said rod extending through said guide disc into a chamber, a diaphragm dividing said chamber into two parts, a first chamber part and a second chamber part, said diaphragm being secured to said rod, an actuating member connected to the end of the rod in said second chamber part and adapted to be set in a predetermined position according to a variation in the weight of the load on the vehicle.

2. A brake apparatus as claimed in claim 1 in which said actuating member is a bar.

3. A brake apparatus as claimed in claim 1 in which said actuating member is a Bowden wire.

References Cited

UNITED STATES PATENTS

| 2,911,263 | 11/1959 | Hill | 188—152 XR |
| 3,211,500 | 10/1965 | Lawson | 303—22 |

FERGUS S. MIDDLETON, *Primary Examiner.*

J. J. McLAUGHLIN, *Assistant Examiner.*